United States Patent [19]
Siegler

[11] Patent Number: 5,261,162
[45] Date of Patent: Nov. 16, 1993

[54] FOLDING POLE HEDGE TRIMMER

[76] Inventor: Frederick Siegler, 444 S. Citrus Ave., Los Angeles, Calif. 90036

[21] Appl. No.: 994,972

[22] Filed: Dec. 14, 1992

[51] Int. Cl.$^5$ ............... B26B 19/02; B26B 19/12; F16C 11/00
[52] U.S. Cl. ............................ 30/216; 30/223; 30/228; 403/116
[58] Field of Search ............... 30/216, 218, 223, 228; 403/83, 84, 112, 116

[56] References Cited

U.S. PATENT DOCUMENTS

| | | | |
|---|---|---|---|
| 961,552 | 6/1910 | Stouffer | 403/84 |
| 2,242,303 | 5/1941 | Irmischer | 403/116 |
| 2,662,412 | 12/1953 | Miller | 30/216 |
| 2,703,928 | 3/1955 | Southwick | |
| 3,838,508 | 10/1974 | Turner, Sr. | 30/216 |
| 4,048,722 | 9/1977 | Howard | |
| 4,654,971 | 4/1987 | Fettes et al. | |
| 4,760,646 | 8/1988 | Siegler | |
| 4,932,126 | 6/1990 | Pilatowicz et al. | 30/216 |
| 4,991,298 | 2/1991 | Matre | |

*Primary Examiner*—Douglas D. Watts
*Assistant Examiner*—Paul M. Heyrana, Sr.
*Attorney, Agent, or Firm*—Thomas I. Rozsa; Dong Chen

[57] ABSTRACT

The present invention is a folding pole hedge trimmer, which is capable of operating at unusual heights, twenty (20) feet or more from the ground. It includes an elbow joint in which the upper hollow pole and the lower hollow pole can be folded for easy storage. The present invention utilizes a very light-weight reciprocating cutting head used for hedge trimming, shaping of tree crowns, cypresses, bougainvilleas and other tall growing plants. The present invention relates to a spring biased mechanical cable drive. The present invention is designed to reduce the weight, complexity and cost of the spring biased mechanical cable drive.

37 Claims, 4 Drawing Sheets

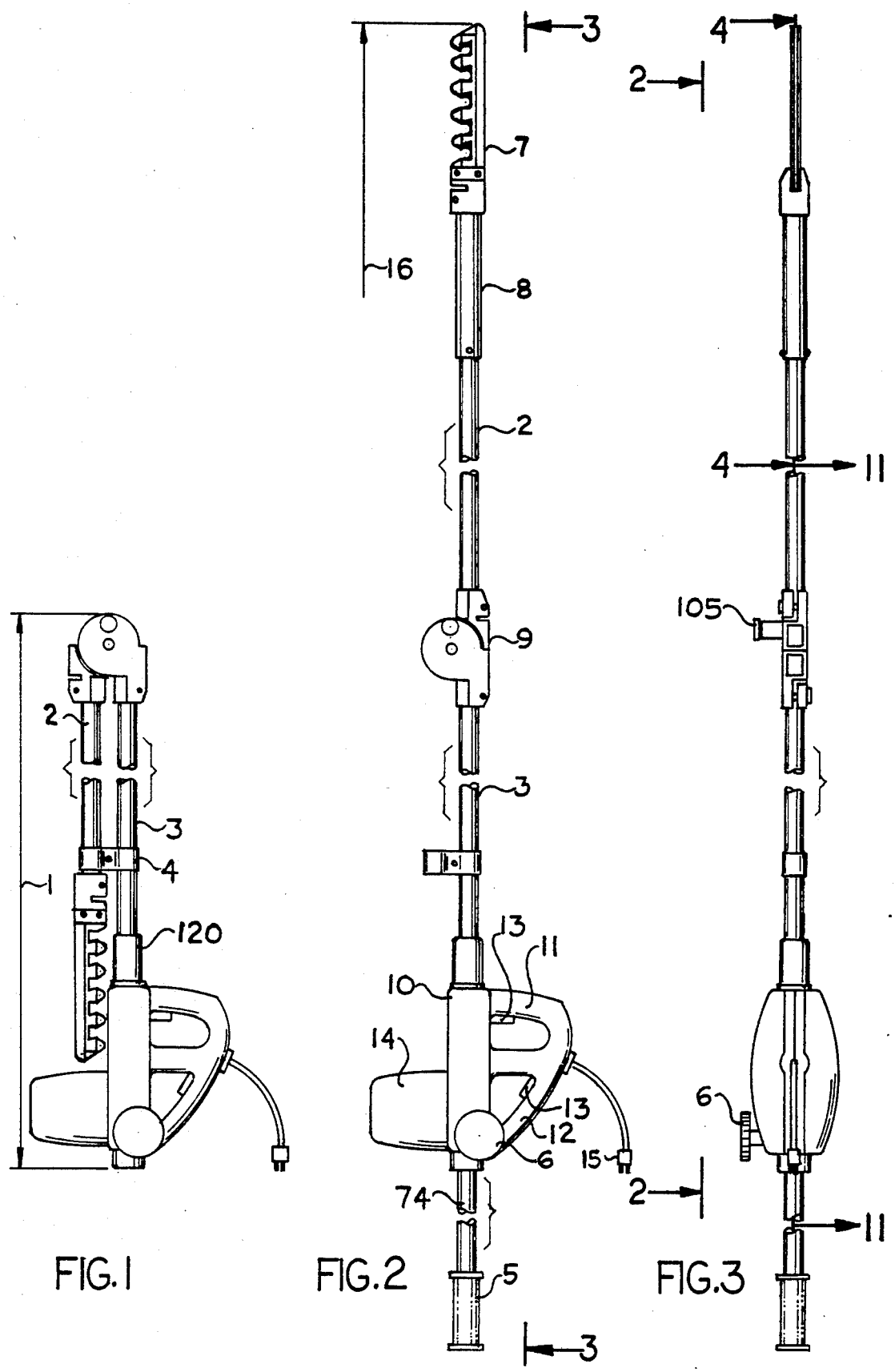

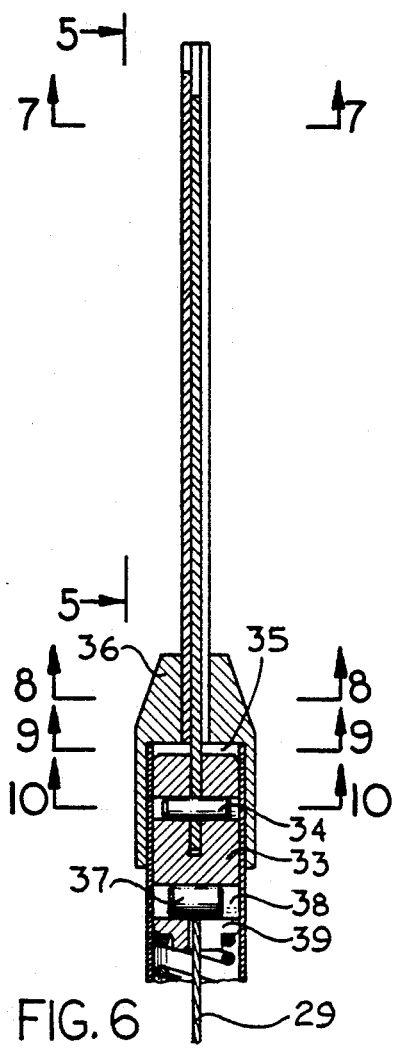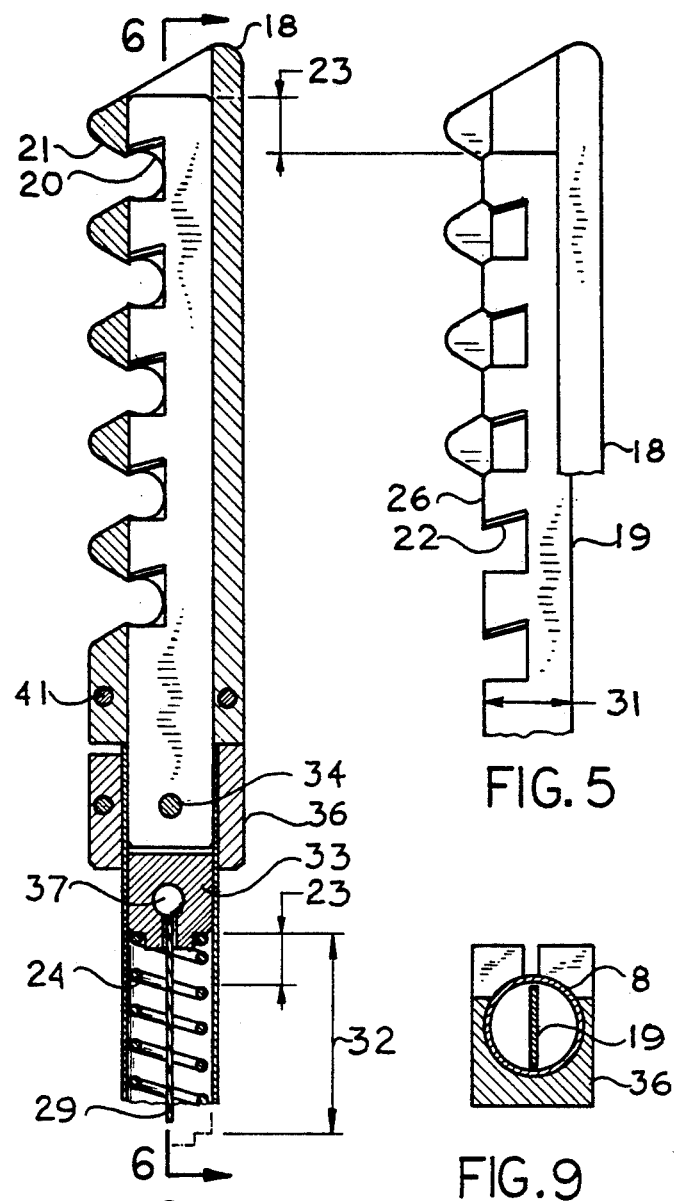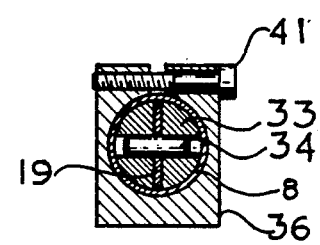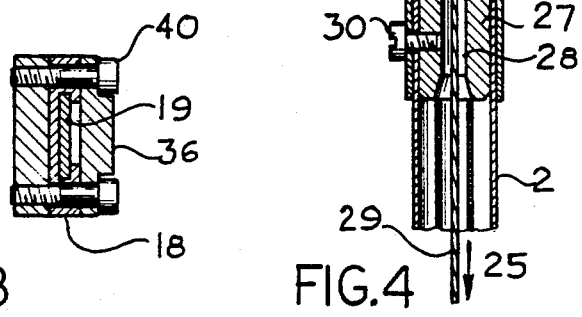

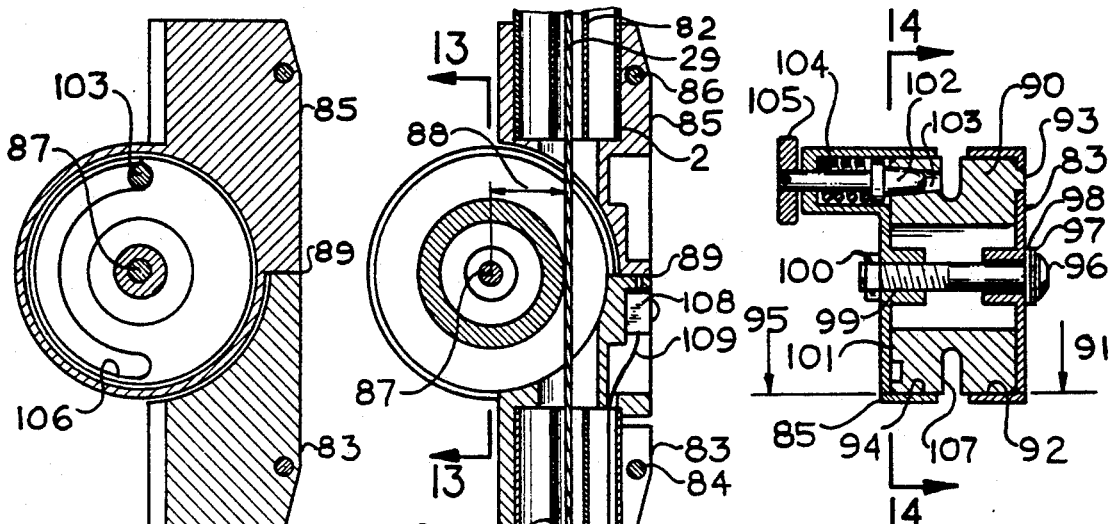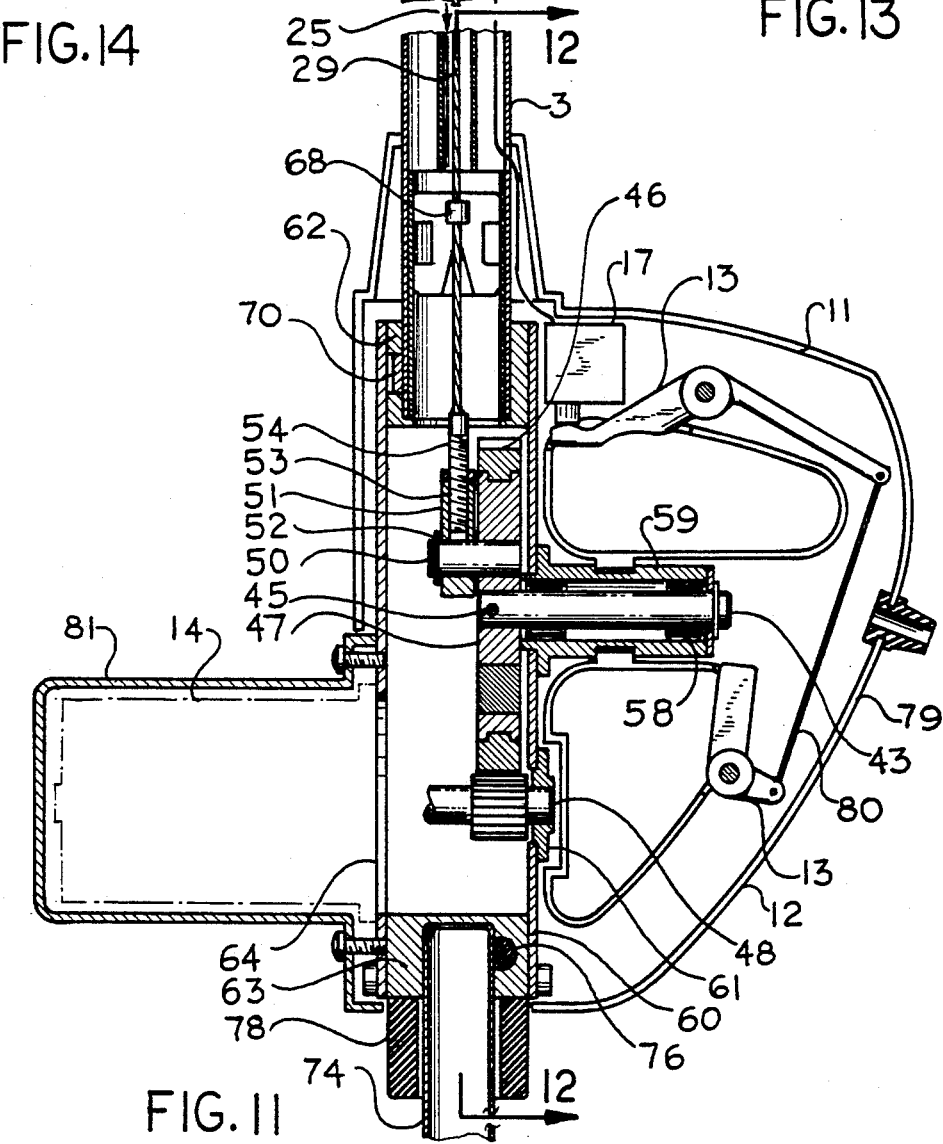

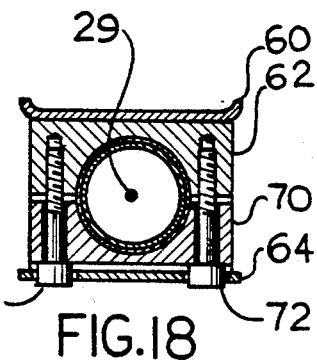
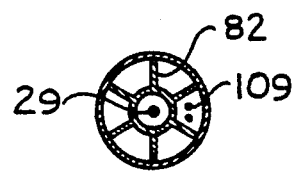
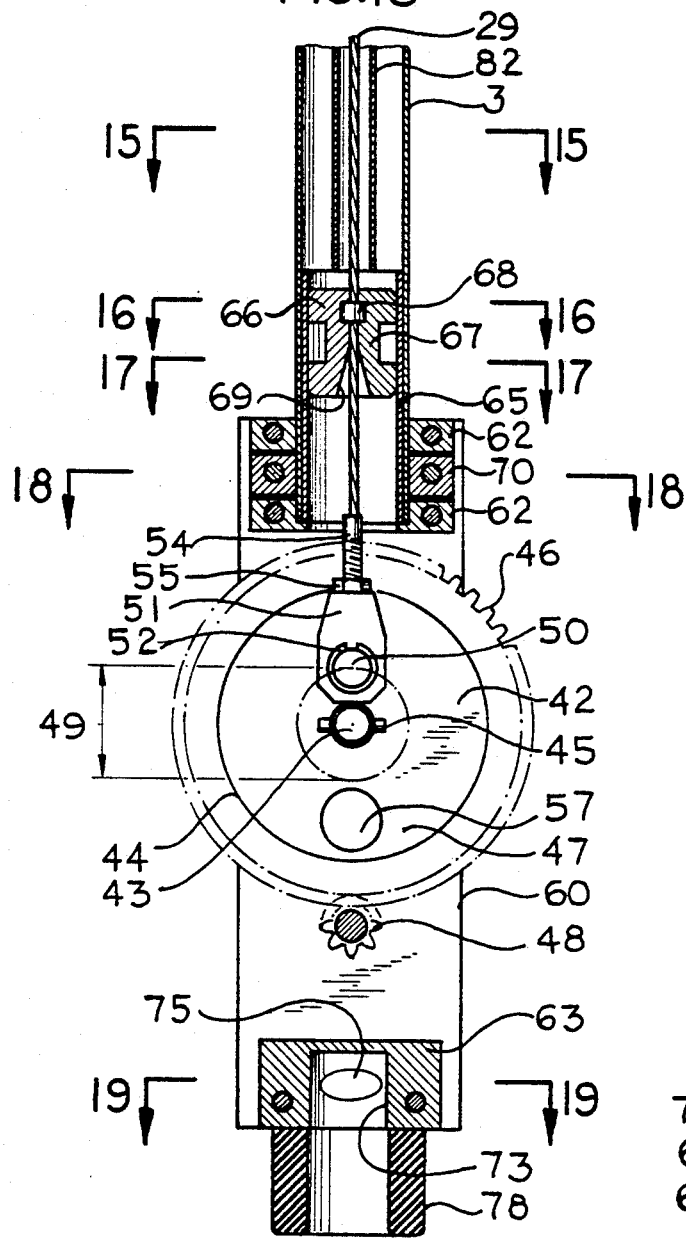
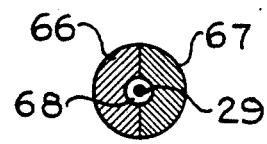
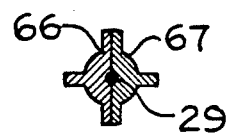
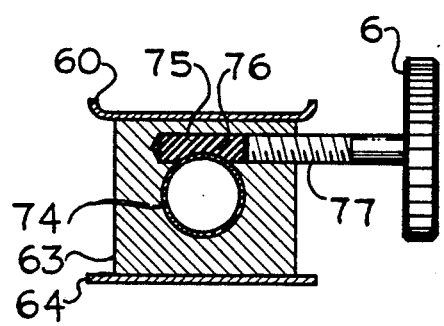

FOLDING POLE HEDGE TRIMMER

BACKGROUND OF THE INVENTION

1. Field of the Invention

The present invention relates generally to a mechanical tree pruning device. In particular, the present invention relates to a hedge trimmer with a folding pole, which has the capability of operating at unusual heights, twenty (20) feet or more from the ground.

2. Description of the Prior Art

Numerous devices for pruning and trimming hedges from the ground up are known in the prior art. Generally, such devices have a power source, a long pole and a cutting apparatus at the top end of the pole. The power source is typically a combustion engine or an electric motor. The following prior art references are relevant to the field of the present invention.

1. U.S. Pat. No. 2,703,928 issued to Southwick (hereafter the "Southwick Patent").
2. U.S. Pat. No. 4,048,722 issued to Howard (hereafter the "Howard Patent").
3. U.S. Pat. No. 4,654,971 issued to Fettes (hereafter the "Fettes Patent").
4. U.S. Pat. No. 4,760,646 issued to Siegler (hereafter the "Siegler Patent").
5. U.S. Pat. No. 4,991,298 issued to Matre (hereafter the "Matre Patent").

In the prior art, the power transmission is typically a rotating shaft inside a telescoping pole. The length of the pole section of these devices are typically changed by telescoping one pole section into another pole section which includes the drive shaft, or attaching pole sections to each other to obtain the desired length. The disadvantage of these devices are related to the overall weight and particularly the weight of the cutting apparatus at the top end of the telescoping pole section. When the device becomes too heavy to operate, it gets to be uncomfortable and its use will be limited. Another disadvantage is the high cost to manufacture these devices which is not practical for today's consumer market.

It has been established that the telescoping pole is functional for a cable drive. However, it requires a storage system for the cable, which consist of several parts and adds weight and cost to the device. With a telescoping pole, the biasing spring load must be adjusted whenever the pole length is adjusted so that the spring can cope with the acceleration forces of the mechanism. It is typical for all pole type tree pruning devices to establish the adjustment to a low limit representing a practical transport and package length. The length is approximately 6 to 7 feet and various other factors limit the practical extended length from 11 to 14 feet. By adding to the extended length the operators proportions and arm position, the reach of the cutting head may be as high as 20 feet. The length of the telescoping poles can be changed by unlocking the telescoping pole members to extend the device to the desired length and re-locking the telescoping pole members.

The Siegler Patent is a spring biased mechanical cable drive. It is a cranking mechanism which creates a reciprocating motion in the cable and two guide rollers guide the cable between the pole entrance and the crank mechanism. It has a rotary action hedge trimmer attachment to the cutting head. The advantage of this approach is that it increases the use of the machine for various purposes. The disadvantage is that it is time consuming to convert the device from one use to the other and back. In addition, the weight of the device is heavy and the main body of the cutting head must cope with chain saw forces.

It is desirable to make the cutting head light in weight, and locate the power source at ground level next to the operator. Because the cutting head and the power source are at least ten (10) feet apart the efficiency and weight of the transmission means is important.

SUMMARY OF THE INVENTION

The present invention is a folding pole hedge trimmer. The present invention provides for an electric motor powered or a gasoline engine powered device. The novel design of the invention permits a plurality of several embodiments which are powered by different means and can be built from the same principal components but at different price ranges and for different market segments.

The present invention utilizes a very light weight reciprocating cutting head used for trimming hedges, shaping of tree crowns, cypresses, bougainvilleas and other tall growing plants. The present invention is an improvement of the spring biased mechanical cable drive in the Sieglar Patent. The present invention is designed to reduce the weight, complexity and cost of the spring biased mechanical cable drive.

The Siegler Patent consists of a power head driven by an electric motor or a gasoline engine generating the reciprocating motion in a cable which is biased by a spring in the cutting head. The reciprocating cable motion is converted by the cutting head into a rotary motion which drives the cutting tool.

The power head is typically a very expensive item. In most devices the housing of the power head incorporates the power source, such as the electric motor or combustion engine. By flange mounting and locating the power source to the opposite side of the housing from the grips, the power source can be altered to meet market demands without changing the control elements of the device. The crankshaft of the power head can be located between the horizontal grip and the vertical grip of the power head housing, which will provide a light weight and compact size.

The cable in the cable drive is always under tension which is capable of transmitting approximately fifteen hundred (1500) pounds or more pulling force. The ratio of the operating load to the breaking load is important because to retain the cable stretch to a minimum, the cable still must be considered as a spring when the dynamics of the mechanism is analyzed. By installing a finned nylon tubular guide inside the pole, the whip of the cable can greatly be reduced, thereby assuring a smooth operation.

The cable guide rollers, shafts and supporting elements of the Siegler Patent can be replaced by a split nylon or teflon slide which is trapped around the cable and inserted into the pole to guide the cable in its up and down motion, comparable to a piston. This will decrease the weight and the cost of the device.

The prior art telescoping pole design permits the use of finned tubular inserts only in the inner member because the outer member has to provide room for the inner member to slide into. With this type of implementation, only half of the cable length can be guided by the finned tubular insert. By having the present invention designed in a folding pole configuration, it permits the use of a finned tubular insert in the full length of the pole, and further provides total control of the cable.

The fulcrum of the rotation must not be less than 10 times the cable diameter, which represents the bend radius of the cable when in the folded and stored position. When the pole is unfolded, it must be tangent to the circle defined by the bend radius and when the pole is unfolded a stop member must be incorporated into the elbow joint on the opposite side from the fulcrum of rotation to keep the joint from buckling under the operating load. A plastic spool anchored to one half of the elbow joint and located between the other half can provide a bearing surface for rotation, which can control the bend radius of the cable in the folded position and can guide the cable in the unfolded position. By anchoring one rotating half to the other in the unfolded position by means of a spring loaded tapered pin to the mating hole in the spool, it can limit the rotation of the two halves to a desired degree by means of a face groove in the spool and the spring loaded tapered pin. The normally open electrical limit switch must be mounted in the cavity of the non-rotating member of the elbow joint which is connected to the electric motor or ignition circuit of the gasoline engine to prevent the power source from starting when the pole is in the folded position.

The geometry and construction of the elbow joint is critical because it must be rigid in all directions when the device is unfolded. When the device is folded, it must protect the cable from being permanently deformed. It must also withstand considerable axial load without buckling when the device is unfolded and it must control the folding arc.

The excessive play in the elbow joint can be eliminated by a central screw in the fulcrum of rotation and clamping one half to the other which introduces a friction between the two halves with the spool in between. The sideways stability of the joint is greatly affected by the outside diameter of the spool which must be selected as large as possible.

The stroke of the cutting head should be less than the 180° arc length of the bent cable of the elbow joint to facilitate the design and selection of the biasing spring in the cutting head. The preload and operating deflection of the spring must meet the dynamic force requirements of the mechanism, but when the pole is folded the arc length of the bent cable will compress the spring beyond its maximum operating deflection. The spring must be designed when it is fully compressed in the folded position for the spring stress to remain below the yield point of the material. This does not mean that the stroke of the cutting head can not be longer than the 180° arc length of the bent cable. In either case, the spring must be designed for the maximum deflection and acceptable stress at that point and meet the operating load requirements at the same time.

The cutting head operation is based on the state of the art principles which has a stationary blade with several sharp edged cavities and a reciprocating blade with the same number of sharp edged cavities. As the cavities open and close, the shrubs are cut which are trapped inside the cavities.

The state of the art tools are typically two sided, which means the cutting cavities are on both sides of the tool. Typically they are double acting, which means that as the blade reciprocates, it cuts in both directions. Typically the moving blade has slots in the center to guide the stationary and moving blade axially to each other. The moving blade is screwed or riveted between a cover plate and the stationary blade. The size of the cutting cavities is a function of the size to be cut and the available power. The stroke is a function of the cavity size and action. The cable actuated spring biased mechanisms are best combined with single acting blades so that cutting takes place when the cable drive is under a powered stroke which provides the cutting force and winding up of the spring. The moving blade stroke must have sufficient over-travel to close the cavity and cut the shrubs but must have the shape to keep the cavity closed and prevent shrubs from entering the cavity prior to opening again under spring load. This is essential since the spring load is established to cope with the dynamic blade acceleration forces which are small compared to the required cutting forces. The total width of the reciprocating blade cannot be more than the inner diameter of the pole or the spring housing which it is mounted on, so that the reciprocating blade can slide into the inner diameter when the pole is folded.

The "C" shaped stationary blade configuration is the most practical and cost effective design because it provides a long relative displacement between the stationary blade and the reciprocating blade which is required when the pole is folded for storage. The "C" shaped guide is superior to the conventional slot type guide because the blade is not weakened by the slot which permits larger cutting cavities in the blade.

For minimum trimming height, the operating position of the device is supported by one hand on the horizontal grip of the power head and the other hand holding the main pole above the power head. For maximum trimming height, the operating position of the device is supported by one hand on the vertical grip of the power head and the other hand holding onto the bottom grip. The arrangement of the grips provides a considerable reach change of approximately 5 feet for the average operator without readjusting the pole length. The interconnected dual controls in the grips permits the shifting from one operating position to the other without readjusting the device, thereby saving operating time and also reducing weight and cost.

The long reach pole type cutting apparatus is frequently used next to high tension electric lines, which is hazardous. By properly selecting the external and internal components, the operator can be completely protected from electrical shock even if the operator accidentally cuts the electrical line.

It has been discovered, according to the present invention, that if the pole section is foldable, it will provide a way to change the pole length and at the same time it can become the storage device for the cable and thereby eliminate the need for a separate storage device. Then the weight and cost of the device can be significantly reduced.

It has been further discovered, according to the present invention, that if the folding joint is correlated with the biasing spring, then it is not necessary to readjust the spring load, and the weight and cost of the device can be significantly reduced.

It has also been discovered, according to the present invention, that properly selecting the pole folding point relative to the power head, most of the work can be accomplished at 14 to 16 feet.

It has been further discovered, according to the present invention, that after the pole is folded out to the fully extended position and the removable bottom grip is clamped to the power head, then the length of the pole can be increased considerably without making further adjustments.

It is therefore an object of the present invention to provide a foldable pole section, wherein the pole length is capable of changing and storing the cable, so that the weight and the cost of the device can be significantly reduced.

It is another object of the present invention to provide a folding joint correlated with the biasing spring, so that it is not necessary to readjust the spring load, and the weight and the cost of the device can be significantly reduced.

It is also an object of the present invention to provide a proper folding point of the pole relative to the power head, so that most of the hedge trimming can be accomplished at 14 to 16 feet.

It is an additional object of the present invention to provide a removable bottom grip clamped to the power head, so that when the pole is folded out to its fully extended position, the length of the pole can be increased without making further adjustments.

It is a further object of the present invention to deal with the configuration of the elbow joint which is an important part of the folding pole principle.

Further novel features and other objects of the present invention will become apparent from the following detailed description, discussion and the appended claims, taken in conjuction with the drawings.

BRIEF DESCRIPTION OF THE DRAWINGS

Referring particularly to the drawings for the purpose of illustration only and not limitation, there is illustrated:

FIG. 1 is a side elevational view of the device fully folded for packaging or transportation.

FIG. 2 is a side elevational view of the folding pole hedge trimmer fully unfolded and the bottom grip clamped in position, taken along line 2—2 of FIG. 3.

FIG. 3 is a rear view of the folding pole hedge trimmer fully unfolded from the operator side, taken along line 3—3 of FIG. 2.

FIG. 4 is a sectional view across the cutting head, taken along line 4—4 of FIG. 3.

FIG. 5 is a partial side view of the stationary and cutting blade at the end of its stroke and closed cavity condition, taken along line 5—5 of FIG. 6.

FIG. 6 is a sectional view depicting the connection between the cable and the reciprocating cutting blade, taken along line 6—6 of FIG. 4.

FIG. 7 is a sectional view depicting the "C" shaped stationary blade, taken along line 7—7 of FIG. 6.

FIG. 8 is a sectional view showing the stationary blade mounted to the body of the cutting head, taken along line 8—8 of FIG. 6.

FIG. 9 is a sectional view depicting the configuration of the cutting head body, taken along line 9—9 of FIG. 6.

FIG. 10 is a sectional view depicting the cutting head body mounted to the pole and the reciprocating blade mounted to the cutting blade slide, taken along line 10—10 of FIG. 6.

FIG. 11 is a sectional view through the power head and the elbow joint, taken along line 11—11 of FIG. 3.

FIG. 12 is a sectional view through the power head, taken along line 12—12 of FIG. 11.

FIG. 13 is a sectional view across the elbow joint showing the internal components, taken along line 13—13 of FIG. 11.

FIG. 14 is a sectional view across the spool showing the face groove, taken along line 14—14 of FIG. 13.

FIG. 15 is sectional view across the fiberglass pole with the finned nylon tubular guide and the cable, taken along line 15—15 of FIG. 12.

FIG. 16 is a sectional view through the interlock between the cable and the split nylon slide, taken along line 16—16 of FIG. 12.

FIG. 17 is a sectional view through the lower part of the split nylon slide, taken along line 17—17 of FIG. 12.

FIG. 18 is a sectional view through the power head and the elbow joint, taken along line 18—18 of FIG. 12.

FIG. 19 is a sectional view through the bottom grip clamp, taken along line 19—19 of FIG. 12.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIG. 1, there is shown a folding pole hedge trimmer 120 in the folded position which is also the package configuration. The preferred folding height 1 is six (6) to seven (7) feet in length, so that the folding pole hedge trimmer 120 can be easily transported and stored by the user. It is also designed to reduce the cost of the manufacturer packaging, inventory space and shipping costs, so that the cost of the device is reduced. To secure the upper pole 2 from movement, it is fasten to the lower pole 3 by a spring clamp 4.

Referring to FIG. 2, there is shown the folding pole hedge trimmer fully extended which includes the bottom grip 5 clamped in place by a knob 6. The reciprocating cutting head 7 is connected to the spring housing 8 and attached to the elbow joint 9 by the upper pole 2. The elbow joint 9 is connected to the power head 10 by the lower pole 3. The power head 10 has a horizontal grip 11 and a vertical grip 12 which provides an interlocking trigger control 13. The power source 14 is mounted to one side of the power head 10. At the opposite side of the power head 10 are the horizontal grip 11 and the vertical grip 12. The power source 14 is an electric motor used on string trimmers or a small combustion engine also used on string trimmers to facilitate mobility. In FIG. 2, the preferred embodiment is shown with the electric version of the folding pole hedge trimmer with the electric plug 15.

The extended length 16 between the bottom grip 5 and the tip of the reciprocating cutting head 7 is approximately fourteen (14) feet, depending on the design parameters. In operation, the folding pole hedge trimmer 120 is fully extended and connected to an electrical outlet with the electrical plug 15. The operator secures the horizontal grip 11 with one hand and secures the lower pole 3 with the other hand. With a relaxed arm holding the horizontal grip 11, a comfortable fourteen (14) to sixteen (16) feet reach can be worked by the operator. By securing the vertical grip 12 with one hand and the bottom grip 5 with the other hand the reach can be increased. By raising the device above the head with both arms, the reach is increased between nineteen (19) to twenty (20) feet for the average person.

Referring to FIGS. 2, 4, 5 and 11, the interlocking trigger controls 13 are acting on a single electric switch 17 or the throttle of a gasoline engine. The reciprocating cutting head 7 consists of a "C" shaped stationary blade 18 in which a reciprocating blade 19 is guided, so that it can be axially displaced. The stationary blade 18 has several sharp edged circular cavities 20 opened and intersected by tapered cut-outs 21 to guide and trap the shrubs and twigs into the circular cavities 20, when the pole is moved along the side of the hedge. The reciprocating blade 19 has the same number of tapered cut-outs 21 as the stationary blade 18 which has a slanted cutting edge 22. Cutting takes place when the reciprocating blade 19 is axially displaced by the power stroke 23. The interaction of the sharp edges of the circular cavities 20 of the stationary blade 18 and the slanted cutting edges 22 of the reciprocating blade 19 shears the trapped materials. The above cutting action is repeated many times when the stroke 23 is mechanically powered, resulting in a reciprocating blade motion. The reciprocating blade 19 is forced to open the circular cavities 20 and the slanted cutting edge 22 by a spring 24, and it is forced to close by a cable force 25 generated by the power head 10. The reciprocating blade 19 has a flat edge 26 which prevent the shrubs from entering the circular cavities 20 at the end of the power stroke 23, because the spring 24 has only sufficient power to cope with the dynamic forces, but insufficient power to provide a cutting force. The spring 24 is located inside the spring housing 8 which is made of thin aluminum tubing. One end of the spring 24 is supported by a cylindrical insert 27 which has a central hole 28 through which the braided steel cable 29 is threaded. The cylindrical insert 27 is made out of nylon to guide the cable and to reinforce the joint between the spring housing 8 and the upper pole 2. The use of nylon for the cylindrical insert 27 also provides an electric insulation of the steel cable 29 from adjacent components.

Referring to FIGS. 4 through 12, the spring housing 8 slides over the upper pole 2 which is preferably made from fiberglass tubing and secured together by a screw 30 or preferably a clamp. The reciprocating blade width 31 is less than the inner diameter of the spring housing 8, so that the reciprocating blade 19 can slide into the spring housing 8, when the pole is folded and the steel cable 29 is shortened by the folding arc length 32 of the elbow joint 9. The other end of the spring 24 is attached to the reciprocating blade slide 33 which is pinned to the reciprocating blade 19 by a pin 34 and is preloaded by the cable force 25, so that a small clearance 35 exists between the reciprocating blade slide 33 and the cutting head body 36. The steel cable 29 is connected to the reciprocating blade slide 33 with a cylindrical knob 37 and is brazed to the steel cable 29. The cylindrical knob 37 slides into the cylindrical cavity 38 through the slot 39 from the side to provide a joint. The reciprocating blade slide 33 is made of nylon for electrically insulating the reciprocating blade 19 from the steel cable 29 which also provides a material combination between the sliding elements, thereby requiring minimum lubrication. The stationary blade 18 is secured to the cutting head body 36 with screws 40. The cutting head body 36 is clamped to the spring housing 8 with a screw 41. The reciprocating motion required by the cutting head 7 is generated in the power head 10 with a crankshaft 42, which consists of a shaft 43 attached to a gear 44 with a pin 45.

Referring to FIGS. 11 through 19, the tooth portion 46 of the gear 44 are molded of nylon around the aluminum diecast hub portion 47 of the gear 44, to provide a quiet non-lubricated gear mesh with a sintered steel pinion 48. The sintered steel pinion 48 is attached to the power source 14 of an electric motor or the output end of a centrifugal clutch which is typically part of a small internal combustion engine. The speed reduction ratio from the sintered steel pinion 48 to the gear 44 is matched to the power source 14 characteristics. The crankshaft stroke 49 is equal to the cutting head stroke 23 by pressing a crankpin 50 off center from shaft 43 into the gear hub 47 by half the value of the stroke 23. Any stroke can be obtained from the same crankshaft 42 by making provisions for other crankpin locations. A sintered oilite bronze crank bearing 51 is rotatably mounted to the crankpin 50 and secured from sliding off by the snap ring 52. The crankpin bearing 51 is threaded at the top end 53 to receive the cable connector 54 and brazed to the steel cable 29. The lock nut 55 secures the assembly.

To balance the rotating and part of the reciprocating masses for smooth operation, provisions are made in the aluminum diecast crankshaft hub 47 to install an appropriate number of balance weights 57. The crankshaft 42 is supported with two crankshaft bearings 58 located in a flanged aluminum diecast housing 59 which is mounted to a stamped aluminum side plate 60. The sintered steel pinion 48 is supported with a pilot bearing 61 which is also mounted to the side plate 60. A top block 62 and a bottom block 63 is sandwiched between the side plates 60 and 64 to retain the various components together. This symmetrical structure provides a frame to support the loads and to attach the various components.

The lower pole 3 is made of fiberglass and equipped with a short aluminum sleeve 65 at the power head joint. The aluminum sleeve 65 provides the support it needs to clamp the fiberglass pole. It also provides a surface quality and material combination to operate the nylon slides 66 and 67. The two nylon slides 66 and 67 are identical and split along its vertical axis, which forms a cylindrical body when snapped around the button 68 which is brazed to steel cable 29. The bottom portion of the nylon slides 66 and 67 are bell mouthed 69 which has a curvature to reduce the cable bending stress to a minimum. The steel cable 29 acts like a connecting rod between the button 68 and the crankpin 50, and it is always in tension. The cable force 25 fluctuates between the spring preload and the cutting load. The spring preload and spring rate are selected such that the operating speed is below the no follow speed of the mechanism. The lower pole 3 is clamped to the top block 62 with a U-clamp 70 which fits into a center slot of the top block 62 which is secured with screws 71 and 72. The bottom block 63 has a cylindrical cavity 73 to receive the shaft 74 of the bottom grip 5. The cylindrical cavity 73 is intersected with a bore 75 and contains a cylindrical elastomer 76. The shaft 74 of the bottom grip 5 is inserted into the cylindrical cavity 73 and by means of the knob 6 and threads 77, the cylindrical elastomer 76 in the bore 75 is squeezed against the shaft 74 of the bottom grip 5, locking it to the bottom block 63 by means of friction.

The folding pole hedge trimmer 120 can be operated without the bottom grip 5 being attached. A hollow rubber bumper 78 is attached to the bottom block 63 to protect the power head 10 from being damaged when placing it on the ground. The horizontal grip 11 and the vertical grip 12 are part of a clamshell plastic housing 79 arranged so that the crankshaft bearing housing 59 is located between the horizontal grip 11 and the vertical grip 12. For the trigger controls 13, the interlock 80 and the electric switch 17, fastening details can be designed in several different ways and the described version illustrates only one preferred way.

The power source 14 is flange mounted to the side plate 64 in which case the housing portion 81 is modified to accept the particular power source 14. Locating the power source 14 on the opposite side of the trigger controls 13 assures that the power source 14 can be interchangeable while retaining the costly highly tooled portion of the machine. The upper pole 2 and lower pole 3 are inserted with a finned nylon tubular guide 82 to restrict any cable vibration which may develop.

The elbow joint 9 has a stationary half 83 clamped to the lower pole 3 with a screw 84. The upper pole 2 is clamped to the rotating half 85 with a screw 86. The fulcrum 87 of the rotation is offset by a distance 88, which is the bend radius of the steel cable 29 when the upper pole 2 is folded, as shown in FIG. 1. The distance 88 must not be less than ten times the steel cable 29 diameter to avoid overstressing of the cable. To assure that the upper pole 2 and the lower pole 3 are aligned when unfolding the stationary half 83 and the rotating half 85 of the elbow joint 9, both halves will contact each other at surface 89. The center of surface 89 is located about equal to the distance 88.

The cable load 25 is equally shared at the fulcrum 87 and the surface 89. The cable load 25 tends to keep the two pole halves aligned. Between the stationary half 83 and rotating half 85, a cylindrical nylon plastic spool 90 with a diameter 91 is sandwiched coaxially with the fulcrum 87. The spool 90 fits into the cavity 92 of the stationary half 83 and is anchored by a button 93. The other end of the spool 90 fits into cavity 94 of the rotating half 85. When the elbow joint 9 is folded, the rotation is coaxial with fulcrum 87 and it takes place on bearing surface 95 between the spool 90 and rotating half 85. The stationary half 83, the spool 90 and rotating half 85 are clamped together by a screw 96, a steel washer 97, a teflon washer 98, thread 99 and a lock nut 100. The torque on the screw 96 is established such that all slack is eliminated and a drag friction is generated between the spool face 101 and the rotating half 85. To lock the upper pole 2 and the lower pole 3 to each other when the poles are unfolded, a tapered plunger 102 is engaged in the mating hole 103 of the spool 90. The plunger 102 is forced into engagement by a spring 104. The pole sections can only be folded when a manual force is applied to the knob 105 to disengage the plunger 102 from the spool 90.

A face groove 106 and the interaction of the plunger 102 limits the maximum folding arc to approximately 180 degrees. The spool 90 has a groove 107 all around with a minor radius equal to the distance 88. In the folded position, the minor radius dictates the cable bend radius and in the unfolded position, the groove sidewalls guide the steel cable 29 from one pole section to the other. The machine is inoperable when the poles are folded as shown in FIG. 1 and a normally open electrical limit switch 108 is mounted to the stationary part 83 next to the surface 89, which opens the circuit of the power source 14. In the combustion engine, it disables the ignition circuit and in the case of an electric motor, it disables the motor circuit. The wire harness 109 is threaded through one of the chambers of the finned tubular guide 82.

It will be appreciated that the present invention is not limited as described above. It is emphasized that while the folding pole hedge trimmer and the electric motor is the preferred embodiment, it is also within the spirit and scope of the present invention to have a folding pole hedge trimmer with a combustion engine, or a chain saw with an electric motor or combustion engine. In addition, it will not be too hard for one skilled in the art to form a multiplicity of configurations.

The present invention has many advantageous features including: (a) it can be used with an electric motor or a combustion engine; (2) the basic machine consisting of the power head and the folding pole can be mounted with either a chain saw cutting head or a hedge trimmer cutting head; (3) it has a folding pole for easy storage; (4) the weight of the present invention is reduced for easy maneuvering; and (5) it is inexpensive to manufacture.

Defined in detail, the present invention is a portable folding pole hedge trimmer apparatus for trimming hedges, shaping of tree crowns, cypresses, bougainvilleas and other tall growing plants, comprising: (a) a hedge trimmer unit, an electric motor unit and a bottom grip; (b) an elongated foldable pole including an upper hollow pole and a lower hollow pole, each having an upper end and a lower end; (c) said hedge trimmer unit having a reciprocating cutting head affixed to a spring housing; (d) a narrow cutting blade slidably attached to said spring housing; (e) said upper end of said upper hollow pole attached to said spring housing of said hedge trimmer unit by a first clamping means; (f) an elbow joint having a fulcrum, a nylon spool, a stationary half and a rotating half pivoted to the stationary half; (g) said nylon spool sandwiched between said stationary and rotating halves of said elbow joint; (h) said lower end of said upper hollow pole attached to said rotating half of said elbow joint by a second clamping means, and said upper end of said lower hollow pole attached to said stationary half of said elbow joint by a third clamping means; (i) a power head having a horizonal grip and a vertical grip which includes an interlocking trigger control, the power head having a top end and a bottom end, the top end attached to said lower end of said lower hollow pole by a fourth clamping means; (j) said bottom grip attached to said bottom end of said power head for providing an extended cutting distance; (k) a gear mechanism engaged by a pinion means of said electric motor unit and engaged with a crankshaft mechanism for providing power to said hedge trimmer unit; (l) said electric motor unit mounted to a sidewall of said power head and located oppositely to said horizontal and vertical grips; (m) a finned tubular guide extending through inside said upper and lower hollow poles for housing a driving cable which is inserted there through and connecting said crankshaft mechanism to said hedge trimmer unit to provide power; and (n) a locking mechanism for locking said upper and lower hollow poles to each other when said upper and lower hollow poles are unfolded; (o) whereby when said portable folding pole hedge trimmer apparatus is not used, said elongated foldable pole can be folded at said elbow joint by folding said upper hollow pole towards and in parallel with said lower hollow pole and attached together, and when said portable folding pole hedge trimmer apparatus is to be used, said elongated foldable pole can be unfolded at said elbow joint by unfolding said upper hollow pole away from and in coaxial alignment with said lower hollow pole and locked in position by said locking mechanism.

Defined broadly, the present invention is a portable folding pole apparatus which utilizes a hedge trimmer unit driven by a motor unit for trimming hedges, shaping of tree crowns, cypresses, bougainvilleas and other tall growing plants, the portable folding pole apparatus comprising: (a) an elongated foldable pole including an upper pole and a lower pole, each having a top end and a bottom end; (b) an elbow joint having a fulcrum, a nylon spool, a stationary member and a rotating member pivoted to the stationary member; (c) said nylon spool sandwiched between said stationary and rotating members of said elbow joint; (d) said bottom end of said upper pole attached to said rotating member of said elbow joint by a first fastening means, said top end of said lower pole attached to said stationary member of said elbow joint by a second fastening means; (e) said top end of said upper pole attached to said hedge trimmer unit by a third fastening means; (f) a power head having a horizontal grip and a vertical grip, the power head installed and attached to said bottom end of said lower pole by a fourth fastening means; (g) said power head having a gear mechanism engaged by a pinion means of said motor unit and engaged with a crankshaft mechanism for providing power to said hedge trimmer unit; (h) a finned tubular guide extending through inside said upper and lower poles for housing a driving cable which is inserted there through and connecting said crankshaft mechanism to said hedge trimmer unit to provide power; and (i) a locking means for locking said upper and lower poles to each other when said upper and lower poles are unfolded; (j) whereby when said portable folding pole hedge trimmer apparatus is not used, said elongated foldable pole can be folded at said elbow joint by folding said upper pole towards and in parallel with said lower pole and attached together, and when said portable folding pole hedge trimmer apparatus is to be used, said elongated foldable pole can be unfolded at said elbow joint by unfolding said upper pole away from and in coaxial alignment with said lower pole and locked in position by said locking means.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A portable folding pole hedge trimmer apparatus for trimming hedges, shaping of tree crowns, cypresses, bougainvilleas and other tail growing plants, comprising:
   a. a hedge trimmer unit, an electric motor unit and a bottom grip;
   b. an elongated foldable pole including an upper hollow pole and a lower hollow pole, each having an upper end and a lower end;
   c. said hedge trimmer unit having a reciprocating cutting head affixed to a spring housing;
   d. a narrow cutting blade slidably attached to said spring housing;
   e. said upper end of said upper hollow pole attached to said spring housing of said hedge trimmer unit by a first clamping means;
   f. an elbow joint having a fulcrum, a nylon spool, a stationary half and a rotating half pivoted to the stationary half;
   g. said nylon spool sandwiched between said stationary and rotating halves of said elbow joint;
   h. said lower end of said upper hollow pole attached to said rotating half of said elbow joint by a second clamping means, and said upper end of said lower hollow pole attached to said stationary half of said elbow joint by a third clamping means;
   i. a power head having a horizonal grip and a vertical grip which includes an interlocking trigger control, the power head having a top end and a bottom end, the top end attached to said lower end of said lower hollow pole by a fourth clamping means;
   j. said bottom grip attached to said bottom end of said power head for providing an extended cutting distance;
   k. a gear mechanism engaged by a pinion means of said electric motor unit and engaged with a crankshaft mechanism for providing power to said hedge trimmer unit;
   l. said electric motor unit mounted to a sidewall of said power head and located oppositely to said horizontal and vertical grips;
   m. a finned tubular guide extending through inside said upper and lower hollow poles for housing a driving cable which is inserted therethrough and connecting said crankshaft mechanism to said hedge trimmer unit to provide power; and
   n. a locking mechanism for locking said upper and lower hollow poles to each other when said upper and lower hollow poles are unfolded;
   o. whereby when said portable folding pole hedge trimmer apparatus is not used, said elongated foldable pole can be folded at said elbow joint by folding said upper hollow pole towards and in parallel with said lower hollow pole and attached together, and when said portable folding pole hedge trimmer apparatus is to be used, said elongated foldable pole can be unfolded at said elbow joint by unfolding said upper hollow pole away from and in coaxial alignment with said lower hollow pole and locked in position by said locking mechanism.

2. The invention as defined in claim 1 wherein said lower and upper hollow poles are made of fiberglass material.

3. The invention as defined in claim 1 wherein said upper and lower hollow poles are folded and attached together by a fifth clamping means.

4. The invention as defined in claim 4 wherein said hedge trimmer unit is a spring biased internal cable drive.

5. The invention as defined in claim 4 wherein said folding pole hedge trimmer becomes a storage compartment to said internal cable drive.

6. The invention as defined in claim 1 wherein said hedge trimmer unit has a built-in spring preload which assures a safety margin to a no follow speed and needs no spring load readjustment when unfolding said elongated foldable pole.

7. The invention as defined in claim 1 wherein said finned tubular guide is made of nylon.

8. The invention as defined in claim 1 further comprising a split nylon slide which is trapped around said driving cable and guides said driving cable into said lower and upper hollow poles.

9. The invention as defined in claim 8 wherein said split nylon slide has a bell mouthed internal cavity to control a bent cable radius and cable stress.

10. The invention as defined in claim 1 wherein said nylon spool has a circular groove with a minor radius of ten to twenty times of a diameter of said driving cable.

11. The invention as defined in claim 10 wherein said fulcrum of said elbow joint is off center from said elongated foldable pole center by the amount of said minor spool radius.

12. The invention as defined in claim 10 wherein said minor groove diameter of said nylon spool is tangent to said driving cable.

13. The invention as defined in claim 1 wherein said nylon spool is anchored to said stationary half of said elbow joint which provides a bearing surface for said rotating half.

14. The invention as defined in claim 1 wherein said stationary and rotating halves of said elbow joint have a contact surface with the center being about a same distance from said driving cable as said minor radius of said nylon spool but on an opposite side from said fulcrum.

15. The invention as defined in claim 1 wherein said nylon spool has a face groove and a locating hole engaged into a spring biased tapered plunger to limit the movement of said rotating half.

16. The invention as defined in claim 1 wherein said elbow joint has a clamping screw located in said fulcrum and tightened to eliminate free play and to generate friction on said nylon spool.

17. The invention as defined in claim 1 wherein said stationary half of said elbow joint has a cavity for an electric limit switch which disarms a power control circuit when said elbow joint is folded.

18. A portable folding pole apparatus which utilizes a hedge trimmer unit driven by a motor unit for trimming hedges, shaping of tree crowns, cypresses, bougainvilleas and other tall growing plants, the portable folding pole apparatus comprising:
  a. an elongated foldable pole including an upper pole and a lower pole, each having a top end and a bottom end;
  b. an elbow joint having a fulcrum, a nylon spool, a stationary member and a rotating member pivoted to the stationary member;
  c. said nylon spool sandwiched between said stationary and rotating members of said elbow joint;
  d. said bottom end of said upper pole attached to said rotating member of said elbow joint by a first fastening means; said top end of said lower pole attached to said stationary member of said elbow joint by a second fastening means;
  e. said top end of said upper pole attached to said hedge trimmer unit by a third fastening means;
  f. a power head having a horizontal grip and a vertical grip, the power head installed and attached to said bottom end of said lower pole by a fourth fastening means;
  g. said power head having a gear mechanism engaged by a pinion means of said motor unit and engaged with a crankshaft mechanism for providing power to said hedge trimmer unit;
  h. a finned tubular guide extending through inside said upper and lower poles for housing a driving cable which is inserted therethrough and connecting said crankshaft mechanism to said hedge trimmer unit to provide power; and
  i. a locking means for locking said upper and lower poles to each other when said upper and lower poles are unfolded;
  j. whereby when said portable folding pole hedge trimmer apparatus is not used, said elongated foldable pole can be folded at said elbow joint by folding said upper pole towards and in parallel with said lower pole and attached together, and when said portable folding pole hedge trimmer apparatus is to be used, said elongated foldable pole can be unfolded at said elbow joint by unfolding said upper pole away from and in coaxial alignment with said lower pole and locked in position by said locking means.

19. The invention as defined in claim 18 further comprising a bottom grip attached to a bottom end of said power head for providing an extended cutting distance.

20. The invention as defined in claim 18 further comprising an interlocking triggering means of said power head.

21. The invention as defined in claim 18 wherein said lower and upper poles are made of fiberglass material.

22. The invention as defined in claim 18 wherein said motor unit is a gasoline engine.

23. The invention as defined in claim 18 wherein said motor unit is an electric motor.

24. The invention as defined in claim 18 wherein said hedge trimmer unit is a spring biased internal cable drive.

25. The invention as defined in claim 24 wherein said folding pole apparatus becomes a storage compartment to said internal cable drive.

26. The invention as defined in claim 18 wherein said hedge trimmer unit has a built-in spring preload which assures a safety margin to a no follow speed and needs no spring load readjustment when unfolding said elongated foldable pole.

27. The invention as defined in claim 18 wherein said finned tubular guide is made of nylon.

28. The invention as defined in claim 18 further comprising a split nylon slide which is trapped around said driving cable and guides said driving cable into said lower and upper pole.

29. The invention as defined in claim 28 wherein said split nylon slide has a bell mouthed internal cavity to control a bent cable radius and cable stress.

30. The invention as defined in claim 28 wherein said nylon spool has a circular groove with a minor radius of ten to twenty times of a diameter of said driving cable.

31. The invention as defined in claim 28 wherein said fulcrum of said elbow joint is off center from said elongated foldable pole center by the amount of said minor spool radius.

32. The invention as defined in claim 28 wherein said minor groove diameter of said nylon spool is tangent to said driving cable.

33. The invention as defined in claim 18 wherein said nylon spool is anchored to said stationary member of said elbow joint which provides a bearing surface for said rotating member.

34. The invention as defined in claim 18 wherein said stationary and rotating members of said elbow joint have a contact surface with a center being about a same distance from said driving cable as said minor radius of said nylon spool but on an opposite side from said fulcrum.

35. The invention as defined in claim 18 wherein said nylon spool has a face groove and a locating hole engaged into a spring biased tapered plunger to limit the movement of said rotating member.

36. The invention as defined in claim 18 wherein said elbow joint which has a clamping screw located in said fulcrum and tightened to eliminate free play and to generate friction on said nylon spool.

37. The invention as defined in claim 18 wherein said stationary member of said elbow joint has a cavity for an electric limit switch which disarms a power control circuit when said elbow joint is folded.

* * * * *